Jan. 16, 1951  C. T. YATES  2,538,181
FISH LURE
Filed Oct. 28, 1949
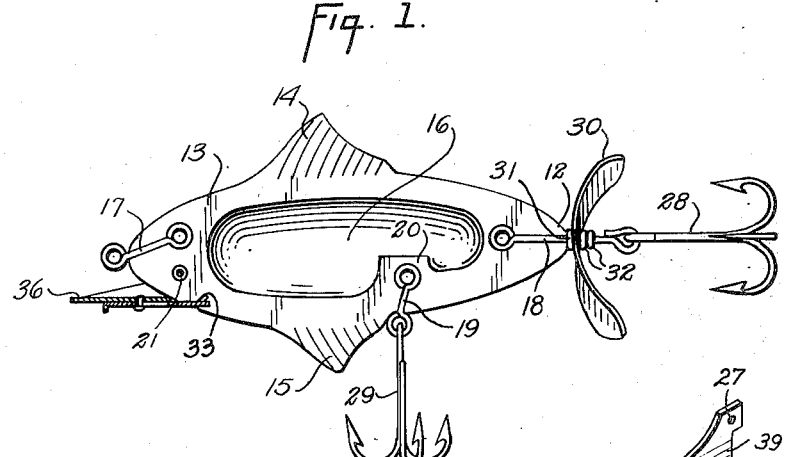
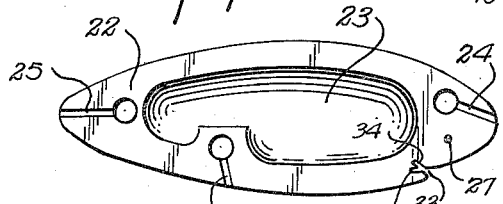
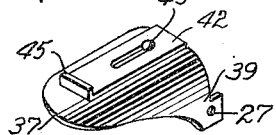
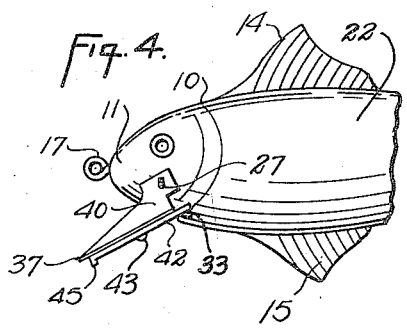
INVENTOR
CHARLES. T. YATES,
BY
McMorrow, Berman & Davidson
ATTORNEYS

UNITED STATES PATENT OFFICE 2,538,181

FISH LURE

Charles T. Yates, Washington, N. C.

Application October 28, 1949, Serial No. 124,127

2 Claims. (Cl. 43—42.22)

This invention relates to fish lures and more particularly to a bait simulating casting lure or plug having an adjustable diving control.

It is among the objects of the invention to provide an improved fish lure of hollow construction and formed of moldable material for ease and economy of manufacture while retaining the bouyant characteristics of such lures, which has hook and line fasteners embedded therein and a diving control vane adjustably secured thereto, and which is simple and durable in construction, neat and attractive in appearance, and highly effective in simulating the appearance and action of an aquatic creature, such as a minnow, furnishing food for game fish.

Other objects and advantages will become apparent from a consideration of the following description and the appended claims in conjunction with the accompanying drawing, wherein:

Figure 1 is a side elevation of the inner side of one part of the lure, a dive controlling vane attached to the lure being shown in cross section;

Figure 2 is a side elevation of the inner side of the other part of the lure;

Figure 3 is a perspective view of a dive controlling vane for the lure with the vane in inverted position;

Figure 4 is a side elevation of the complete lure with the dive controlling vane set for deep diving operation of the lure;

Figure 5 is a view similar to Figure 4 showing the vane set for shallow diving operation of the lure; and Figure 6 is a perspective view of a dive controlling vane for the lure with the vane in upright position.

With continued reference to the drawing the lure comprises an elongated hollow body 10 of rounded cross sectional shape and tapered from a location intermediate its length to both ends. The ends are also rounded and the end 11 constitutes the head end while the end 12 constitutes the tail end of the lure body, which body has the general configuration of a small fish or minnow.

The lure body 10 is formed of two parts having meeting faces along a longitudinally extending medial plane of the lure body. One of the parts, as indicated at 13, is particularly illustrated in Figure 1 and has upper and lower fins 14 and 15 formed thereon. Figure 1 illustrates the inner side of the part 13 which meets the corresponding side of the other part of the lure body to constitute the complete body. This part 13 is formed with an elongated, rounded concavity 16 and has in its opposite ends substantially semi-circular grooves one of which receives the line attaching eye 17 at the head end of the lure body and the other of which receives the tail hook attaching eye 18. In its lower side the part 13 is provided with a third groove which receives a bottom hook eye 19 and this groove is partly provided in a portion 20 extending into the concavity 16.

Each of the fasteners 17, 18 and 19 is an elongated wire member having a substantially circular eye at each end and the grooves receiving these members are enlarged at their inner ends to receive the eyes at the inner ends of the fasteners.

An aperture is provided in the head end portion of the part 13 and a brad 21 is mounted in this aperture so that its head is substantially flush with the inner side of the part and its pointed end protrudes beyond the surface of the outer side of the part 13 at this location.

The complementary part 22 of the lure body is similar in all respects to the part 13 except that it does not have the fin formations 14 and 15 thereon. It does have an elongated concavity 23 in its inner side and grooves 24, 25 and 26 of semi-circular cross sectional shape which receive the portions of the fasteners 17, 18 and 19 projecting above the corresponding inner surface of the part 13. The part 22 also has near its head end an aperture receiving a brad 27 the pointed end of which projects beyond the surface of the outer side of this part for a purpose which will presently appear.

In assembling the lure, after the fasteners 17, 18 and 19 and the brad 21 are properly located in the part 13, the brad 27 is located in the part 22 and the part 22 is then placed on the part 13 so that the complementary meeting faces of the two parts are in contact and the edges of the two parts at these meeting faces substantially flush with each other. The two parts are then permanently secured together by fusing or cementing whereupon the two concavities 16 and 23 provide an air containing cavity or hollow in the lure body. If found more desirable the brads 21 and 27 may be omitted and after the two parts of the lure body are secured together, a single brad may be inserted through the registering apertures in the two body parts to protrude at its ends at respectively opposite sides of the lure body.

Hooks 28 and 29 are carried by the fasteners 18 and 19 and a small propeller or agitator 30 is pivotally mounted substantially at its mid-length location on the fastener 18 just at the tail end of the lure body. A glass bead 31 surrounds the fastener 18 between the agitator 30 and the lure body and two or more glass beads 32 surround the fastener 18 at the outer side of the agitator to constitute bearings for the agitator or propeller.

After the two parts 13 and 22 have been secured together a notch 33 is provided in the lure body below and slightly to the rear of the brads 21 and 27, this notch 33 having a common opening at the lower edge of the lure body but having beyond this opening two inwardly diverging parts 34 and 35 for a purpose which will later apply.

A dive controlling vane 36 is secured to the lure body adjacent the head end thereof to project forwardly of the body, as particularly illustrated in Figures 1, 4 and 5. This vane comprises a transversely curved plate 37 having one end arcuately rounded, as indicated at 38, and having at its opposite end two spaced apart arms 39 and 40 which are provided with apertures to receive the brads 21 and 27 respectively, which brads pivotally secure the vane to the lure body adjacent the head end of the body.

An elongated substantially rectangular plate 42 is disposed against the under side of the vane 36 and slidably secured thereto by a pin 43 which is secured in the plate 37 and depends therefrom through an elongated slot 44 in the plate 42. At its forward end the plate 42 is provided with a depending tab 45 which constitutes a finger grip for sliding the plate 42 relative to the vane 37 and at its rearward end the plate 42 projects into the notch 33. When the vane is set for deep diving operation of the lure the plate 42 projects into the upper part 34 of the two part notch, as illustrated in Figure 4, and when the vane is set for shallow diving operation of the lure the plate projects into the lower part 35 of the notch as particularly illustrated in Figure 5.

By sliding the plate 42 forwardly the fisherman may release it from the notch 33 and move the vane to its alternative operating position and then move the plate 42 inwardly into the corresponding part of the notch to hold the vane in the selected operative position.

The lure may be colored and decorated as may be desired and may be made in different sizes and weights for different types of casting without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish lure comprising an elongated hollow body having a tapered head end and a notch in the lower edge of said body adjacent said head end, said notch including two parts diverging inwardly relative to each other, a vane extending forwardly of the head end of said body and having two spaced apart arms disposed at respectively opposite sides of said body and pivotally connected thereto adjacent said notch, and a plate slidably secured to said vane and selectively engageable at one end in the two parts of said notch to hold said vane at either of two positions relative to said body for shallow diving or deep diving operation of the lure.

2. A fish lure comprising an elongated hollow body having a tapered head end and a notch in the lower edge of said body adjacent said head end, said notch including two parts diverging inwardly relative to each other, a vane extending forwardly of the head end of said body and having two spaced apart arms disposed at respectively opposite sides of said body and pivotally connected thereto adjacent said notch, a plate disposed against the under side of said vane and having an elongated slot therein and a depending tab at its forward end, a pin secured to said vane and projecting through said slot to slidably secure said plate to said vane, said plate being selectively engageable at its rear end in the two parts of said notch to hold said vane at either of two positions relative to said body for shallow diving or deep diving operation of the lure.

CHARLES T. YATES.

REFERENCES CITED

The following references are of record in the file of this patent:

UNITED STATES PATENTS

| Number | Name | Date |
|---|---|---|
| 841,429 | Passage | Jan. 15, 1907 |
| 1,220,921 | Wilson | Mar. 27, 1917 |
| 2,149,054 | Jones | Feb. 28, 1939 |
| 2,307,200 | Cullerton | Jan. 5, 1943 |